United States Patent [19]

Matsuda et al.

[11] Patent Number: 5,234,086
[45] Date of Patent: Aug. 10, 1993

[54] FLUID PRESSURE TYPE BOOSTER DEVICE

[75] Inventors: Shohei Matsuda, Wako, Japan; Makoto Horiuchi, Nagano, both of Japan

[73] Assignees: Honda Giken Kogyo Kabushiki Kaisha; Nissin Kogyo Co. Ltd., Tokyo, Japan

[21] Appl. No.: 841,631

[22] Filed: Feb. 27, 1992

[30] Foreign Application Priority Data

Feb. 28, 1991 [JP] Japan .................. 3-034578

[51] Int. Cl.$^5$ ............................. B60T 8/32
[52] U.S. Cl. .......................... 188/358; 303/52; 303/92; 303/113.1; 303/115.5; 303/119.1; 303/116.1; 60/547.1; 60/550
[58] Field of Search ............... 303/113 TR, 113 TB, 303/113 AP, 10–12, 114 R, 115 PP, 117, 13–15, 115 R, 115 FM, 116 R, 119 R, 119 S, 119 V, 92, 114 P, 114 B, 50–52, 84.2, 113 R, 113.1–119.2; 188/358, 359; 60/547.1, 581, 554, 550, 553, 551

[56] References Cited

U.S. PATENT DOCUMENTS

| | | | |
|---|---|---|---|
| 4,312,182 | 1/1982 | Filderman | 60/581 |
| 4,464,899 | 8/1984 | Myers et al. | 60/547.1 |
| 4,604,870 | 8/1986 | Bach et al. | |
| 4,624,108 | 11/1986 | Leiber . | |
| 4,651,528 | 3/1987 | Carré et al. . | |
| 4,776,646 | 10/1988 | Siegel . | |
| 4,874,207 | 10/1989 | Nishii et al. . | |
| 4,875,338 | 10/1989 | Leiber . | |
| 4,964,676 | 10/1990 | Resch . | |
| 4,995,677 | 2/1991 | Matsuda et al. | 303/52 X |
| 5,024,056 | 6/1991 | Zivkovic . | |
| 5,106,170 | 4/1992 | Matsuda et al. | 303/113 TR X |

FOREIGN PATENT DOCUMENTS

| | | |
|---|---|---|
| 3634292A1 | 4/1988 | Fed. Rep. of Germany . |
| 3823616A1 | 1/1989 | Fed. Rep. of Germany . |
| 2169369A | 7/1986 | United Kingdom . |

Primary Examiner—Douglas C. Butler
Attorney, Agent, or Firm—Armstrong, Westerman, Hattori, McLeland & Naughton

[57] ABSTRACT

A fluid pressure type booster device is capable of feeding an output pressure of a fluid pressure source in a controlled manner by permitting a slide member to slide so as to balance the force acting in an advancing direction by a fluid pressure of a pressure chamber in accordance with an operation of an operating member and the reaction force of a reaction chamber. The device includes an input piston slidably fitted in a housing to define the pressure chamber between the input piston and an interlocking member, a spring mounted in a compressed manner between the input piston and the interlocking member, and an on-off valve interposed between the pressure chamber and the fluid tank so as to be closed in accordance with an advancing movement of the input piston with respect to the interlocking member by an amount not less than a predetermined value. The spring is arranged to start contracting for closing the on-off valve in accordance with the advancing movement of the input piston from a state in which the slide member has been so advanced as to place the input port in communication with the output port.

32 Claims, 6 Drawing Sheets

FLUID PRESSURE TYPE BOOSTER DEVICE

BACKGROUND OF THE INVENTION

1. Field of the Invention

This invention generally relates to a fluid pressure type booster device of a type having a housing and a slide member. The housing includes an input port connected to a fluid pressure source, a release port connected to a fluid tank, and an output port connected to a fluid pressure apparatus. The slide member has a front surface facing a reaction chamber leading to the output port and is slidably fitted in the housing for movement between an advanced position to place the input port in communication with the output port and a retracted position to place the release port in communication with the output port. A pressure chamber is defined in the housing, which chamber is capable of generating a fluid pressure in response to operation of an operating member and which faces a back surface of the slide member or an interlocking member operatively connected to the slide member.

2. Description of the Prior Art

Such a conventional device is already known as disclosed in Japanese Patent Application Laid-open No. 116346/87. According to such prior art device, fluid pressure generated in a master cylinder by depression of a brake pedal is applied to a back surface of a piston which is coaxially abutted against a back surface of a slide member slidably fitted in a housing, and the slide member is movable in front and rear directions by a balance between a pressure acting on the back surface of the piston and a reaction force acting on the front surface of the slide member, thereby applying an amplified fluid pressure to a fluid pressure apparatus. The brake pedal is also referred to hereafter as an operating member.

In the prior art device, however, since the housing and the master cylinder are formed as separate parts, it is necessary to provide a piping for connecting the pressure chamber in the housing and the master cylinder and thus, it is difficult to make the structure compact. Further, since the pressure is applied to the pressure chamber from an initial stage of operation, the friction force of a seal member between the housing and the slide member or an interlocking member operatively connected to the slide member becomes relatively large in accordance with the pressure acting on the seal member and therefore, the operating force required at the initial stage of operation inevitably becomes relatively large.

SUMMARY OF THE INVENTION

Accordingly, it is an object of the present invention to provide a fluid pressure type booster device in which the whole structure can be made compact and in which the operational force required at an initial stage of operation can be relatively small, thereby improving an operating feel.

In order to achieve the above object, according to a first feature of the present invention, a fluid pressure type booster device has a housing including an input port connected to a fluid pressure source, a release port connected to a fluid tank, and an output port connected to a fluid pressure operated apparatus; and a slide member having a front surface facing a reaction chamber leading to the output port and slidably fitted in the housing for movement between an advancing position to place the input port in communication with the output port, and a retreating position to place the release port in communication with the output port; a pressure chamber which is capable of generating a fluid pressure in response to operation of an operating member arranged to face a back surface of the slide member or an interlocking member operatively connected to the slide member, wherein the device includes an input piston operatively connected to the operating member and slidably fitted in the housing to define the pressure chamber between the input piston and the slide member or the interlocking member, a spring mounted in a compressed manner between the input piston and the slide member or the interlocking member, and an on-off valve interposed between the pressure chamber and the fluid tank and arranged to be closed in accordance with an advancing movement of the input piston with respect to the slide member or the interlocking member by an amount not less than a predetermined value, the spring being arranged to start contracting for closing the on-off valve in accordance with the advancing movement of the input piston from a state in which the slide member has been so advanced as to place the input port in communication with the output port.

According to this arrangement, components which are operable to feed a fluid pressure to a fluid pressure operated apparatus in a controlled fashion are accommodated in the housing together with the pressure chamber in a compact manner. The operational input force is mechanically transmitted to the slide member at the initial stage of operation so as to avoid increasing a friction loss at a seal member which may be caused due to a fluid pressure of the pressure chamber, thereby enabling the initial operation input force to be reduced and improving the operational feel.

In addition to the above arrangement, if the pressure chamber is connected to an accumulation chamber of a stroke accumulator, it is possible to ensure an operation stroke of the operating member after the control of the fluid pressure by the slide member is started.

Further, if the pressure chamber is connected to the fluid pressure operated apparatus in the above-described arrangement, it is possible to apply non-amplified fluid pressure to the fluid pressure operated apparatus corresponding to the amount of displacement of the operating member.

The above and other objects, features and advantages of this invention will be apparent from the following description of the preferred embodiments taken in conjunction with the accompanying drawings.

DETAILED DESCRIPTION OF THE PREFERRED EMBODIMENTS

The present invention will now be described with reference to the accompanying drawings by way of embodiments in which the present invention is applied to brake devices for a front wheel drive vehicle.

Figure 1:
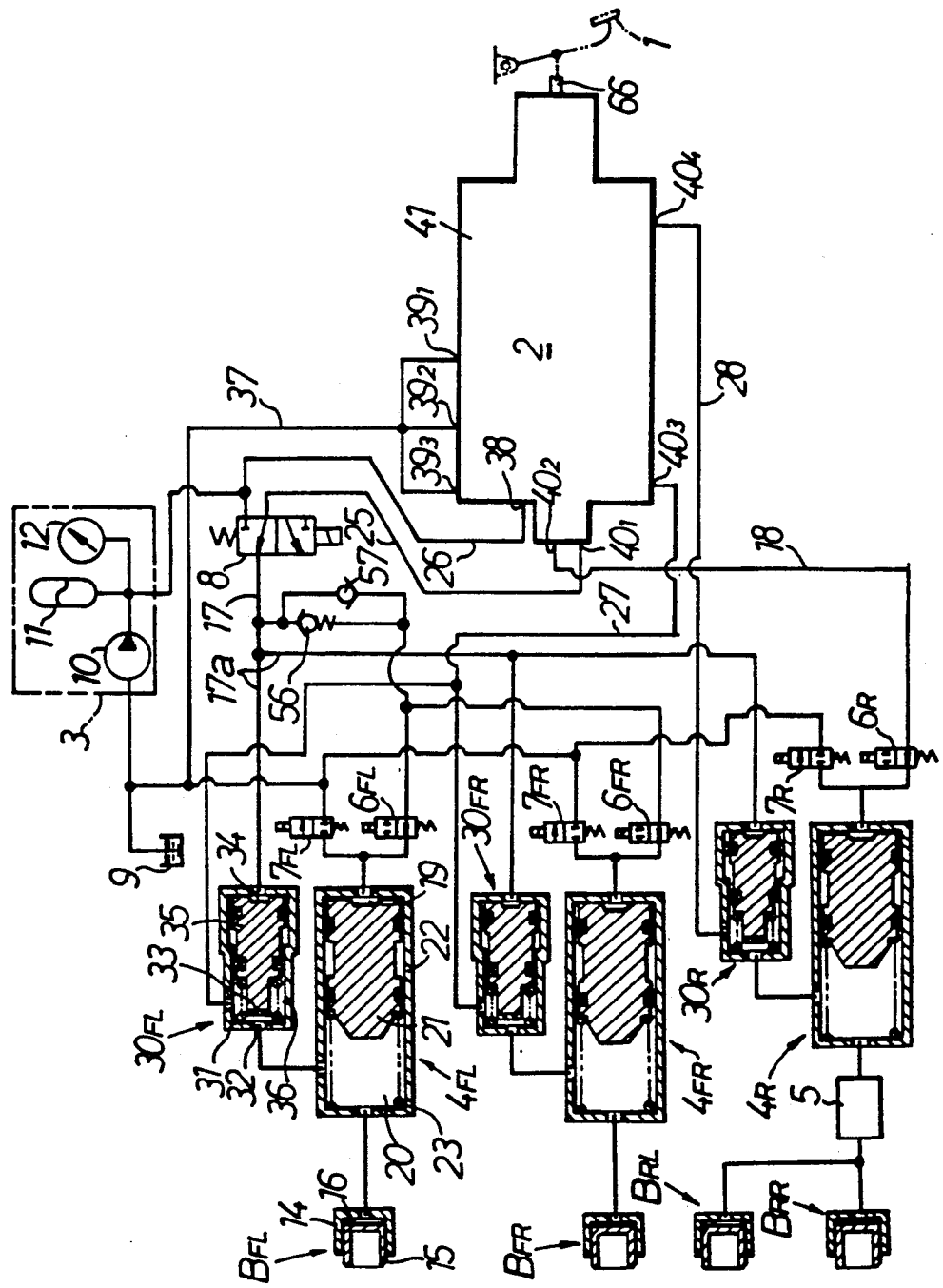
FIG. 1 is a diagram of a fluid pressure circuit of a brake device for a vehicle.

Referring first to FIG. 1, a left front wheel brake device $B_{FL}$ and a right front wheel brake device $B_{FR}$ as fluid pressure apparatuses are mounted on left and right front wheels as driven wheels, respectively, and a left rear wheel brake device $B_{RL}$ and a right rear wheel brake device $B_{RR}$ as fluid pressure apparatuses are mounted on left and right rear wheels as follower wheels, respectively. Connected to a brake pedal 1 as an operating member is a fluid pressure control unit 2 which is capable of controlling output pressure from a fluid pressure source 3 dependent on an amount by which the brake pedal 1 is depressed During normal braking, an amplified fluid pressure output from the fluid pressure control unit 2 is applied to each of the front wheel brake devices $B_{FL}$ and $B_{FR}$ through fluid pressure transmitting means $4_{FL}$ and $4_{FR}$ respectively, and an amplified fluid pressure from the fluid pressure control unit 2 is also applied to each of the rear wheel brake devices $B_{RL}$ and $B_{RR}$ through a fluid pressure transmitting means $4_R$ and a proportional pressure-reducing valve 5. When the fluid pressure source 3 has failed, non-amplified fluid pressure output from the fluid pressure control unit 2 is applied to each of the brake devices $B_{FL}$, $B_{FR}$, $B_{RL}$ and $B_{RR}$ in accordance with an amount of the brake pedal L depressed.

Further, a brake fluid pressure for each of the brake devices $B_{FL}$, $B_{FR}$, $B_{RL}$, and $B_{RR}$ can be maintained or reduced to effect anti-lock control by inlet valves $6_{FL}$ and $6_{FR}$ and outlet valves $7_{FL}$ and $7_{FR}$ which are provided independently in correspondence to the front brake devices $B_{FL}$ and $B_{FR}$ and by an inlet valve $6_R$ and an outlet valve $7_R$ provided for common use with both the rear wheel brake devices $B_{RL}$, $B_{RR}$. Furthermore, the braking fluid pressure for both the front wheel brake devices $B_{FL}$ and $B_{FR}$ can be increased to effect traction control by a traction-controlling switchover control valve 8.

The fluid pressure source 3 is comprised of a fluid pressure pump 10 for pumping up working fluid such as oil from a reservoir 9 as a fluid tank, an accumulator 11 connected to the fluid pressure pump 10, and a pressure switch 12 for controlling the operation of the pump 10.

Each of the brake devices $B_{FL}$, $B_{FR}$, $B_{RL}$ and $B_{RR}$ is comprised of a cylinder 14 and a control piston 15 slidably fitted in the cylinder 14, and is adapted to produce a braking force by a movement of the control piston 15 in response to a fluid pressure acting on a braking fluid pressure chamber 16 which is defined between the cylinder 14 and the control piston 15.

Fluid pressure transmitting means $4_{FL}$, $4_{FR}$ and $4_R$ are respectively disposed at intermediate locations along fluid pressure passages extending from the fluid pressure source 3 to the brake devices $B_{FL}$, $B_{FR}$, $B_{RL}$ and $B_{RR}$ via the fluid pressure control unit 2. Each of the pressure transmitting means $4_{FL}$, $4_{FR}$ and $4_R$ transmits the amplified fluid pressure from the fluid pressure control unit 2 to each of the brake devices $B_{FL}$, $B_{FR}$, $B_{RL}$, and $B_{RR}$ when the fluid pressure from the fluid pressure source 3 is normal. However, when the fluid pressure from the source 3 is abnormally low, each of the pressure transmitting means $4_{FL}$, $4_{FR}$ and $4_R$ functions to prevent a back flow of working fluid from each of the brake devices $B_{FL}$, $B_{FR}$, $B_{RL}$, and $B_{RR}$ toward the fluid pressure control unit 2. These fluid pressure transmitting means $4_{FL}$, $4_{FR}$ and $4_R$ have basically the same structure and hence, only the structure of pressure transmitting means $4_{FL}$ will be described below as a representative example.

The fluid pressure transmitting means $4_{FL}$ is comprised of a free piston 21 slidably fitted in a cylinder body 22 such that opposite ends of the free piston 21 face an input fluid pressure chamber 19 and an output fluid pressure chamber 20, respectively, and a spring 23 accommodated in the output fluid pressure chamber 20 biases the free piston 21 toward the input fluid pressure chamber 19.

With the arrangement shown of the fluid pressure transmitting means $4_{FL}$, it is possible to produce from the output fluid pressure chamber $20a$ a fluid pressure corresponding to the fluid pressure which acts in the input fluid pressure chamber 19, and the working fluid of the output fluid pressure chamber 20 is prevented from flowing toward the input fluid pressure chamber 19. The output fluid pressure chamber 20 of each of the fluid pressure transmitting means $4_{FL}$, $4_{FR}$ is independently in communication with the associated braking fluid pressure chamber 16 of each of the brake devices $B_{FL}$, $B_{FR}$. The output fluid pressure chamber 20 of the fluid pressure transmitting means $4_R$ is connected to the braking fluid pressure chambers 16 of the brake devices $B_{RL}$, $B_{RR}$ through the common proportional pressure-reducing valve 5.

Inlet and outlet valves $6_{FL}$ and $7_{FL}$ are connected in parallel with each other to the input fluid pressure chamber 19 of the fluid pressure transmitting means $4_{FL}$ which corresponds to the front wheel brake device $B_{FL}$. And inlet and outlet valves $6_{FR}$ and $7_{FR}$ are connected in parallel with each other to the input fluid pressure chamber 19 of the fluid pressure transmitting means $4_{FR}$ which Corresponds to the front wheel brake device $B_{FR}$. Further, inlet and outlet valves $6_R$ and $7_R$ are connected in parallel with each other to the input fluid pressure chamber 19 of the fluid pressure transmitting means $4_R$ which corresponds to the rear wheel brake devices $B_{RL}$, $B_{RR}$.

The inlet valves $6_{FL}$, $6_{FR}$ and $6_R$ are normally-open type solenoid valves which are closed when energized, and the outlet valves $7_{FL}$, $7_{FR}$ and $7_R$ are normally-closed type solenoid valves which are opened when energized. The outlet valves $7_{FL}$, $7_{FR}$ and $7_R$ are interposed between the reservoir 9 and the input fluid pressure chambers 19 of the fluid pressure transmitting means $4_{FL}$, $4_{FR}$ and $4_R$, respectively. The inlet valves $6_{FL}$ and $6_{FR}$ are interposed between a fluid passage 17 and the input fluid pressure chambers 19 of the fluid pressure transmitting means $4_{FL}$ and $4_{FL}$, respectively. The inlet valve $6_R$ is interposed between the input fluid pressure chamber 19 of the fluid pressure transmitting means $4_R$ and a fluid passage 18 leading from a second output port $40_2$ of the fluid pressure control unit 2.

The proportional pressure-reducing valve 5 is of conventional structure and is adapted to proportionally reduce the fluid pressure which is output from the output fluid pressure chamber 20 of the fluid pressure transmitting means $4_R$ and to apply the reduced pressure to the braking fluid pressure chambers 16 of the brake devices $B_{RL}$ and $B_{RR}$.

The traction-controlling switchover control valve 8 is a solenoid switchover valve, and is interposed to selectively provide communication between the fluid passage 17 and one of a fluid passage 25 leading from a first output port $40_1$ of the fluid pressure control unit 2 or a fluid passage 26 leading from the fluid pressure source 3. The traction-controlling switchover control valve 8 is capable of selectively changing over between a first mode to establish communication between the fluid passages 25 and 17 in a deenergized state, and a second mode to establish communication between the fluid passages 26 and 17 in an energized state.

The fluid pressure control unit 2 includes, in addition to the first and second output ports $40_1$ and $40_2$ which are capable of outputting amplified fluid pressures, third and fourth output ports $40_3$ and $40_4$ which are capable of outputting non-amplified fluid pressure corresponding to the operating force imparted to the brake pedal 1. A fluid passage 27 leading from the third output port $40_3$ is connected to a junction between the left front wheel brake device $B_{FL}$ and the fluid pressure transmitting means $4_{FL}$ through a bypass valve $30_{FL}$, and is further connected to a junction between the right front brake device $B_{FR}$ and the fluid pressure transmitting means $4_{FR}$ through a bypass valve $30_{FR}$. A fluid passage 28 leading from the fourth output port $40_4$ is connected to a junction between the proportional pressure-reducing valve 5 and the fluid pressure transmitting means $4_R$ through a bypass valve $30_R$. These bypass valves $30_{FL}$, $30_{FR}$ and $30_R$ have the same structure and thus, the structure of only the bypass valve $30_{FL}$ will be described below.

The bypass valve $30_{FL}$ includes a cylindrical bypass valve body 31 With its opposite ends closed, a valve port 32 bored through one end wall of the bypass valve body 31 to communicate with the output fluid pressure chamber 20 of the fluid pressure transmitting means $4_{FL}$, and a piston 35 provided at one end thereof with a valve member 33 capable of closing the valve port 32. The piston 35 is slidably fitted in the bypass valve body 31 and is spring-biased toward a pilot chamber 34 which is defined between the piston 35 and the other end wall of the bypass valve body 31. A valve chamber 36 in communication with the fluid passage 27 is defined between the one end wall of the bypass valve body 31 and the piston 35.

With this bypass valve $30_{FL}$, when the fluid pressure of the pilot chamber 34 is lower than a given value, the piston 35 is moved toward the pilot chamber 34 to a position where the valve member 33 releases the valve port 32 to open the valve $30_{FL}$, whereas when the fluid pressure of the pilot chamber 34 becomes equal to or greater than the given value, the piston 35 is moved to cause the valve member 33 to close the valve port 32, thus closing the valve $30_{FL}$.

Passages 17a which branch off the fluid passage 17 are in communication with the respective pilot chambers 34 of the bypass valves $30_{FL}$, $30_{FR}$ and $30_R$. Therefore, when the output pressure from the fluid pressure source 3 is at a normal level and normal amplified fluid pressure is output from the first output port $40_1$ of the fluid pressure control unit 2, the bypass valves $30_{FL}$ and $30_{FR}$ are closed to cut off the communication between the third output port $40_3$ and the brake devices $B_{FL}$, $B_{FR}$. On the other hand, when the output pressure of the fluid pressure source 3 is abnormally reduced and thus the output pressure from the first output port $40_1$ is abnormally low, the bypass valves $30_{FL}$, $30_{FR}$ are opened, and the brake devices $B_{FL}$, $B_{FR}$ and the third output port $40_3$ are placed in mutual communication.

Further, when the output pressure of the fluid pressure source 3 is at a normal level and normal amplified fluid pressure is output from the first output port $40_1$ of the fluid pressure control unit 2, the bypass valve $30_R$ is closed to cut off the communication between the fourth output port $40_4$ and the brake devices $B_{RL}$, $B_{RR}$, whereas when the output pressure of the fluid pressure source 3 is abnormally reduced and the output pressure from the first output port $40_1$ is low, the bypass valve $30_R$ is opened to put the fourth output port $40_4$ into communication with the brake devices $B_{RL}$, $B_{RR}$.

Figure 2:
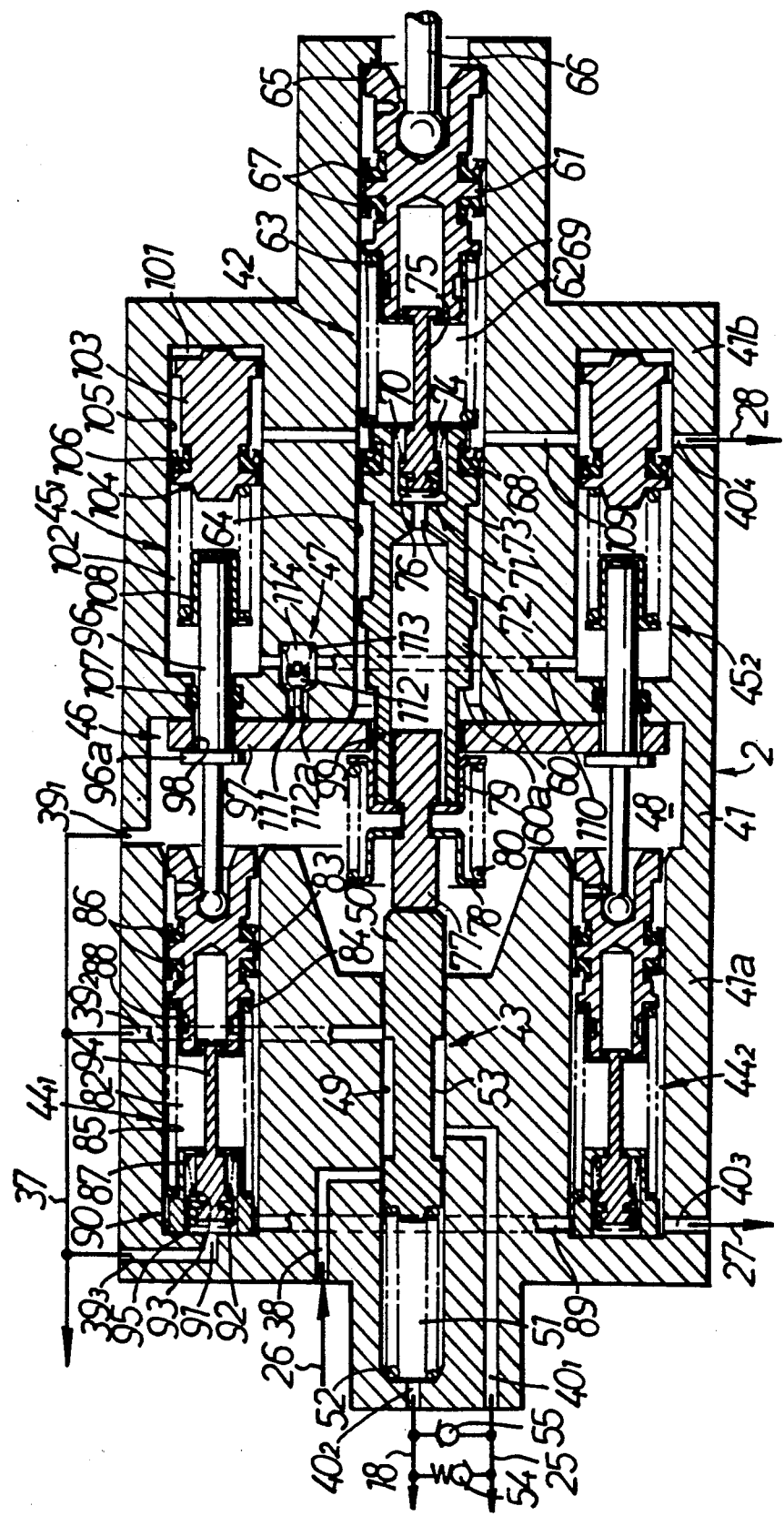
FIG. 2 is a longitudinal sectional view of a fluid pressure control unit.

In FIG. 2, a housing 41 of the fluid pressure control unit 2 includes an input port 38 connected to the fluid pressure source 3 through the fluid passage 26, as well as first, second and third release ports $39_1$, $39_2$ and $39_3$ which are in common communication with a fluid passage 37 leading to the reservoir 9. The first output port $40_1$ is in communication with the fluid passage 25, the second output port $40_2$ is in communication with the fluid passage 18, the third output port $40_3$ is in communication with the fluid passage 27, and the fourth output port $40_4$ is in communication with the fluid passage 28.

Disposed in the housing 41 are an operating pressure generating means 42 capable of generating non-amplified fluid pressure which corresponds to the operating force applied by the brake pedal 1, a boost control valve means 43 capable of controlling the output pressure of the fluid pressure source 3 in accordance with an extent of depression of the brake pedal 1 so as to output an amplified fluid pressure, first and second auxiliary fluid pressure generating means $44_1$ and $44_2$ for feeding auxiliary fluid pressure to the brake devices $B_{FL}$ and $B_{FR}$ in place of the output pressure of the boost control valve means 43 when the output pressure of the fluid pressure source 3 is abnormally reduced, first and second stroke accumulators $45_1$ and $45_2$ for accumulating the pressure generated by the operating pressure generating means 42 in response to the stroke of the brake pedal 1, connecting means 46 for transmitting the operating force of the brake pedal 1 to the first and second auxiliary fluid pressure generating means $44_1$ and $44_2$ only when the output pressure of the fluid pressure source 3 is abnormally reduced, and a cut-off valve 47 for locking the accumulating operation of the first and second stroke accumulators $45_1$ and $45_2$ when the output pressure of the fluid pressure source 3 is abnormally reduced.

The housing 41 is comprised of a front housing part 41a and a rear housing part 41b. A release chamber 48 is formed between both the front and rear housing parts, and is in communication with the reservoir 9 through the first release port $39_1$ and the fluid passage 37.

The boost control valve means 43 is comprised of a spool valve 50 as a sliding member slidably fitted in a first cylinder bore 49 which is formed substantially at a central portion of the front housing part 41a. A front end of the first cylinder bore 49 is closed by an end wall having the second output port $40_2$. The spool valve 50 is basically formed cylindrically and is slidably fitted in the first cylinder bore 49 such that the spool valve 50 defines a reaction chamber 51 between the valve 50 itself and the front end wall of the first cylinder bore 49, and a rear end of the valve 50 faces the release chamber 48. A return spring 52 is mounted in the reaction chamber 51. The spring 52 exhibits a spring force which biases the spool valve 50 rearwardly.

The input port 38, the first output port $40_1$ and the second release port $39_2$ are provided in the front housing part 41a, so as to be open into an inner surface of the first cylinder bore 49 at spaced distances from one another in the axial direction of the housing 41. The spool valve 50 is provided at an outer surface thereof with an annular groove 53 which permits communication between the input port 38 and the first output port $40_1$ when the spool valve 50 is in its advanced position, and permits communication between the first output port $40_1$ and the second release port $39_2$ when the spool valve 50 is in its retracted position.

The first and second output ports $40_1$ and $40_2$ are connected through a first differential pressure valve 54 which is opened when the fluid pressure of the first output port $40_1$ becomes greater than that of the second output port $40_2$ by a predetermined value so as to permit only a flow of the working fluid from the first output port $40_1$ toward the second output port $40_2$. A first unidirectional valve 55 is connected between both the output ports $40_1$ and $40_2$ in parallel with the first differential valve 54. The first unidirectional valve 55 permits only a flow of the working fluid from the second output port $40_2$ toward the first output port $40_1$. The level of differential pressure required for opening of the first unidirectional valve 55 is set to be extremely small.

As is shown in FIG. 1, a second differential pressure valve 56 is interposed in the fluid passage 17 and is opened when a fluid pressure on the side of the traction-controlling switchover control valve 8 becomes larger than a fluid pressure on the side of both the inlet valves $6_{FL}$ and $6_{FR}$ by a predetermined value, so as to permit only a flow of the working fluid from the traction-controlling switchover control valve 8 toward the inlet valves $6_{FL}$ and $6_{FR}$. A second unidirectional valve 57 is connected to the fluid passage 17 in parallel with the second differential pressure valve 56, and a differential pressure required for opening the second unidirectional valve 57 is set to be extremely small so that, upon opening thereof, flow of working fluid only takes place from the side of both the inlet valves $6_{FL}$ and $6_{FR}$ toward the traction-controlling switchover control valve 8. Further, the passages 17a leading to the pilot chambers 34 of the bypass valves $30_{FL}$, $30_{FR}$ and $30_R$ branch off from the fluid passage 17 at a position upstream of the parallel circuit formed of the second differential pressure valve 56 and the second unidirectional valve 57.

Therefore, the first and second differential pressure valves 54 and 56 permit the output pressure of the first output port $40_1$ to be imparted to the pilot chambers 34 of the bypass valves $30_{FL}$, $30_{FR}$ and $30_R$ earlier than to the fluid pressure transmitting means $4_{FL}$, $4_{FR}$ and $4_R$ at an initial stage of braking operation so as to close the bypass valves $30_{FL}$, $30_{FR}$ and $30_R$. This thereby permits the output pressure of the first and second output ports $40_1$ and $40_2$ to be imparted to the fluid pressure transmitting means $4_{FL}$, $4_{FR}$ and $4_R$ relatively swiftly so as to eliminate backlash which may exist among components along a path to each of the brake devices $B_{FL}$, $B_{FR}$ and $B_R$, thus making the initial operation of the brake piston 15 smooth. The first and second unidirectional valves 55 and 57 release the working fluid in the fluid passages 17 and 18 to the reservoir 9 during non-braking.

The first differential pressure valve 54 and the first unidirectional valve 55 are illustrated in FIG. 2 as being disposed outside the housing 41 for the sake of clarity, but in an actual case, these valves are provided in the front housing part 41a so as to be interposed between the first output port $40_1$ and the reaction chamber 51.

The operating pressure generating means 42 is disposed coaxially with the boost control valve means 43 in the rear housing part 41b. The operating pressure generating means 42 includes an interlocking piston 60 as an interlocking member. The interlocking piston 60 is operatively connected to the spool valve 50 and is slidably fitted in the rear housing part 41b. The operating pressure generating means also includes an input piston 61 which is operatively connected to the brake pedal 1 and is slidably fitted in the rear housing part 41b, and a spring 63 contained in a pressure chamber 62 which is defined between a back surface of the interlocking piston 60 and a front surface of the input piston 61.

A second cylinder bore 64 having a larger diameter than that of the first cylinder bore 49 of the front housing part 41a is formed in the rear housing part 41b coaxially with the bore 49. The interlocking piston 60 and the input piston 61 are slidably fitted in the second cylinder bore 64. A pair of seal members 67 are mounted around an outer surface of the input piston 61 for sliding contact with an inner surface of the second cylinder bore 64, and a seal member 68 is mounted around an outer surface of the interlocking piston 60 for sliding contact with an inner surface of the second cylinder bore 64.

A restraining collar 65 which abuts against a rear end of the input piston 61 to define the retraction limit of the piston 61 radially inwardly protrudes from a rear end of the second cylinder bore 64. A push rod 66 is connected to the brake pedal 1. A front end of the push rod 66 is movably passed through the restraining collar 65 and is swingably connected to the input piston 61. Therefore, the input piston 61 is advanced in accordance with the operation of depressing the brake pedal 1.

A cup-like retainer 69 is fitted over a front end portion of the input piston 61, and a disk-like retainer 70 abuts against a back surface of the interlocking piston 60. A spring 63 is mounted between both the retainers 69 and 70 in a compressed manner.

Interposed between the pressure chamber 62 and the release chamber 48 leading to the reservoir 9 through the fluid passage 37 and the first release port $39_1$ is a first on-off valve 71 which is adapted to be closed in accordance with the input piston 61 approaching the interlocking piston 60 by not less than a predetermined amount while compressing the spring 63. The first on-off valve 71 is formed such that a valve body 73 is biased in its closing direction by a spring 74 and is capable of opening and closing a valve bore 72 which is formed in the interlocking piston 60 so as to be in communication with the release chamber 48. The valve body 73 is mounted at a front end of a valve stem 75 which is at a rear end capable of engaging with the retainer 69. A valve chamber 76 is formed between a rear portion of the interlocking piston 60 and the retainer 70. The valve stem 75 is movably passed through the retainer 70 such that the retraction limit of the stem 75 with respect to the interlocking piston 60 is determined by the retainer 70, and a valve spring 74 is mounted in a compressed manner between the valve stem 75 and the retainer 70 in the valve chamber 76. The rear end of the valve stem 75 comes into engagement with the retainer 69 when a distance between the interlocking piston 60 and the input piston 61 becomes equal to or greater than a predetermined value. Therefore, the first on-off valve 71 is opened in a state where the distance between the interlocking piston 60 and the input piston 61 exceeds the predetermined value as shown in FIG. 2, and is closed in response to advancing movement of the input piston 61 with respect to the interlocking piston 60 by an amount equal to or greater than the predetermined value while compressing the spring 63. After the first on-off valve 71 is closed, fluid pressure is produced in the pressure chamber 62 in response to the advancing movement of the input piston 61 with respect to the interlocking piston 60.

A rod 77 is disposed in the release chamber 48 coaxially with the spool valve 50 and the interlocking piston 60. A front end of the rod 77 abuts against a rear end of the spool valve 50 and a rear end portion of the rod 77 is loosely inserted in a front end portion of the interlocking piston 60. A pair of retainers 78 and 79, which are opposed to each other for axial relative movement therebetween within a limited range, are engaged to an axially intermediate outer surface of the rod 77. A spring 80 is mounted in a compressed manner between both the retainers 78 and 79. The retainer 79 which is located at a rear side in the axial direction of the rod 77 is capable of abutting against a front end of the interlocking piston 60, and the advancing movement of the interlocking piston 60 is transmitted to the spool valve 50 through the retainer 79, spring 80, retainer 78 and rod 77.

If set loads (forces) of the return spring 52, spring 63 and spring 80 are represented by $F_1$, $F_2$ and $F_3$, respectively, these set loads are selected to establish the relationship wherein $F_3 > F_2 > F_1$. Therefore, at an initial stage of braking operation by the brake pedal 1, the spool valve 50 advances and compresses the return spring 52 while keeping the relative positional relationship among the input piston 61, the spring 63, the interlocking piston 60 and the spring 80 as they are. The set load $F_2$ of the spring 63 is determined so that it becomes equal to or larger than that of the return spring 52 at the time when the spool valve 50 has been advanced to a position where the input port 38 is placed in communication with the output port $40_1$. That is, the relative positional relationship between the input piston 61 and the interlocking piston 60 is kept in a state of holding the first on-off valve 71 open until the boost control valve means 43 starts a pressure controlling operation, and after the boost control valve means 43 has started its pressure controlling operation, the advancing movement of the input piston 61 with respect to the interlocking piston 60 is started in accordance with input of an operating force to compress the spring 63, thereby closing the first on-off valve 71.

The first and second auxiliary fluid pressure generating means $44_1$ and $44_2$ are disposed in the front housing part 41a on one diametric line of the first cylinder bore 49 of the boost control valve means 43, with axes of the first and second auxiliary fluid pressure generating means $44_1$ and $44_2$ being parallel with the boost control valve means 43. A distance between the axes of the first means $44_1$ and the first cylinder bore 49 is set equal to a distance between the axes of the second means $44_2$ and the bore 49.

Figure 3:
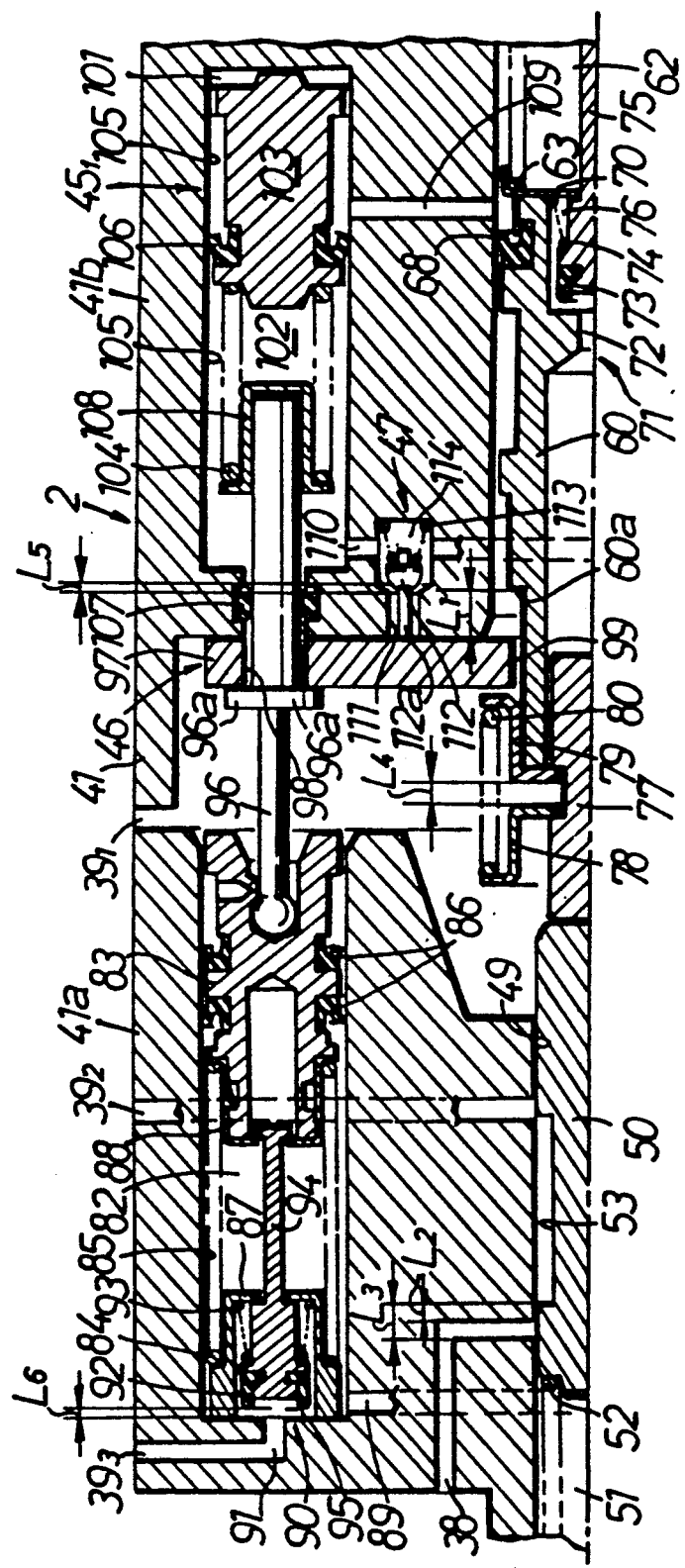
FIG. 3 is an enlarged view of a portion of FIG. 2.

Referring also to FIG. 3, the first and second auxiliary fluid pressure generating means $44_1$ and $44_2$ have basically the same structure and thus, the structure of only the first auxiliary fluid pressure generating means $44_1$ will be described below.

The first auxiliary fluid pressure generating means $44_1$ is comprised of an auxiliary piston 83 slidably fitted in the front housing part 41a for defining an auxiliary fluid pressure generating chamber 82 between the piston 83 itself and the front housing part 41a, and a spring 84 for biasing the auxiliary piston 83 in a direction to increase a volume of the auxiliary fluid pressure generating chamber 82. The front housing part 41a is provided with a third cylinder bore 85 having a front end which is closed and an axis parallel with the first cylinder bore 49. The auxiliary piston 83 is slidably fitted in the third cylinder bore 85 so as to define the auxiliary fluid pressure generating chamber 82 between a front surface of the piston 83 and the front end wall of the third cylinder bore 85. A pair of seal members 86 are fitted around an outer surface of the auxiliary piston 83 for sliding contact with an inner surface of the third cylinder bore 85.

A cup-like retainer 87 abuts against the front end wall of the third cylinder bore 85. A spring 84 is mounted in a compressed manner between the retainer 87 and a cup-like retainer 88 which is fitted over a front end portion of the auxiliary piston 83, and this piston 83 is biased rearwardly by a spring force of the spring 84.

The auxiliary fluid pressure generating chambers 82 of both the first and second auxiliary fluid pressure generating means $44_1$ and $44_2$ are in communication with each other through a communication passage 89 formed in the front housing part 41a, and are also in communication with the third output port $40_3$.

Interposed between the auxiliary fluid pressure generating chamber 82 of the first auxiliary fluid pressure generating means $44_1$ and the third release port $39_3$ which is in communication with the reservoir 9 through the fluid passage 37 is a second on-off valve 90 which is opened when the auxiliary piston 83 is at its retraction limit and is closed in response to the auxiliary piston 83 moving forwardly from the retraction limit.

The on-off valve 90 is comprised of a valve bore 91 formed in the front end wall of the third cylinder bore 85 to communicate with the third release port $39_3$, a valve body 92 capable of opening and closing the valve bore 91, and a spring 93 for biasing the valve body 92 in its closing direction. The valve body 92 is mounted to a front end of a valve stem 94 whose rear end can be engaged with the retainer 88. A valve chamber 95 is defined between the retainer 87 and the front end wall of the third cylinder bore 85. The valve stem 94 is movably passed through the retainer 87 such that a retraction limit of the valve stem 94 is determined by the retainer 87. A valve spring 93 is mounted in a compressed manner between the valve stem 94 and the retainer 87 in the valve chamber 95.

Further, the rear end of the valve stem 94 comes into engagement with the retainer 88 when a distance between the auxiliary piston 83 and the retainer 87 becomes equal to or more than a predetermined value. Therefore, the second on-off valve 90 is opened in a state where the auxiliary piston 83 is in its retraction limit as shown in FIGS. 2 and 3, and is closed in response to the auxiliary piston 83 advancing from the retraction limit while compressing the spring 84. After the second on-off valve 90 is closed, a fluid pressure is generated in the auxiliary fluid pressure generating chamber 82 in response to the advancing movement of the auxiliary piston 83.

The connecting means 46 is comprised of a pair of connecting rods 96 which are axially movably supported in the rear housing part 41b, front end portions of the rods 96 being connected to rear portions of the auxiliary pistons 83 of the first and second auxiliary fluid pressure generating means $44_1$ and $44_2$, respectively, a link plate 97 capable of engaging with both the connecting rods 96 from a rearward direction and capable of abutting against a front end of the rear housing part 41b, and an engaging step 60a mounted on the interlocking piston 60 for engagement with the link plate 97 from rearward.

The link plate 97 is provided with a pair of through holes 98 through which the connecting rods 96 are movably passed and a through hole 99 through which the front portion of the interlocking piston 60 is passed. The connecting rods 96 are provided with retaining collars 96a with which the link plate 97 is engaged from a rearward direction. The engaging step 60a on the interlocking piston 60 is capable of engaging with the periphery of the through hole 99 on a back surface of the link plate 97.

By this connecting means 46, when the input piston 61 advances in response to depression of the brake pedal the engaging step 60a comes in engagement with the link plate 97 from a rearward direction to push the link plate 97 forwardly and further, each retaining collar 96a is pushed by the link plate 97 to move the associated connecting rod 96 forwardly, thereby causing both the auxiliary pistons 83 of the first and second auxiliary fluid pressure generating means $44_1$ and $44_2$ to advance. Further, the retraction limit positions of both the auxiliary pistons 83 of the first and second auxiliary fluid pressure generating means $44_1$ and $44_2$ are defined by the abutment of the link plate 97 against the rear housing part 41b.

The first and second stroke accumulators $45_1$ and $45_2$ are disposed coaxially with the respective first and second auxiliary pressure generating means $44_1$ and $44_2$ in the rear housing part 41b, and have basically the same structure. Therefore, the structure of only the first stroke accumulator $45_1$ will be described below.

The first stroke accumulator $45_1$ is comprised of an accumulator piston 103 slidably fitted in the rear housing part 41b for defining an accumulator chamber 101 and a spring chamber 102 between the rear housing part 41b and the accumulator piston 103 itself, and an accumulator spring 104 for biasing the piston 103 in a direction to increase a volume of the spring chamber 102. The rear housing part 41b is provided with a fourth cylinder bore 105 coaxially arranged with the third cylinder bore 85. Front and rear ends of the bore 105 are closed. The accumulator piston 103 is slidably fitted in the fourth cylinder bore 105 so as to define the accumulator chamber 101 between a back surface of the accumulator piston 103 and a rear end wall of the fourth cylinder bore 105 and the spring chamber 102 between a front surface of the piston 103 and a front end wall of the cylinder bore 105. A seal member 106 is fitted around an outer surface of the accumulator piston 103 for sliding contact with an inner surface of the fourth cylinder bore 105.

A rear portion of the connecting rod 96 of the connecting means 46 is movably passed through the front end wall of the fourth cylinder bore 105 and protrudes into the spring chamber 102, and a seal member 107 is mounted between the front end wall of the cylinder bore 105 and the connecting rod 96. Further, a cup-like retainer 108 is tightly fitted around the rear portion of the connecting rod 96, and the accumulator spring 104 is mounted in a compressed manner between the retainer 108 and the accumulator piston 103. As such accumulator spring 104, one having a non-linear characteristic, in which a load with respect to the amount of expansion and contraction is varied in two steps, is employed here.

The accumulator chambers 101 of the first and second stroke accumulators $45_1$ and $45_2$ are communicated to the pressure chamber 62 of the operational pressure generating means 42 through communication passages 109 formed in the rear housing part 41b, and to the fourth output port 404. The spring chambers 102 of the first and second stroke accumulators $45_1$ and $45_2$ are in communication with each other through a communication passage 110 formed in the rear housing part 41b.

The cut-off valve 47 is arranged to be closed when the link plate 97 advances in response to an abnormal reduction in the output pressure of the fluid pressure source 3 and is disposed in a front portion of the rear housing part 41b between the reservoir 9 and the spring chambers 102 of both the stroke accumulators $45_1$ and $45_2$. The cut-off valve 47 includes a valve bore 111 formed in the front portion of the rear housing part 41b to communicate with the release chamber 48 leading to the reservoir 9 through the first release port 39, and the fluid passage 37, a semi-spherical valve body 112 capable of opening and closing the valve bore 111, and a valve spring 113 for biasing the valve body 112 in a closing direction thereof. The rear housing part 41b is provided with a valve chamber 114 leading to the communication passage 110 which is in communication with the spring chambers 102 of both the stroke accumulators $45_1$ and $45_2$, and the valve body 112 and the valve spring 113 are contained in the valve chamber 114. Further, the valve body 112 is integrally provided with a driving rod 112a which is loosely passed through the valve bore 111, and a front end of the driving rod 112a is abutted against a back surface of the link plate 97.

With such cut-off valve 47, when the link plate 97 is in abutment against the rear housing part 41b, the valve body 112 assumes its opening position by the driving rod 112a, and when the link plate 97 is moved away from the rear housing part 41b for advancing movement, the valve body 112 is biased by the valve spring 113 and closed.

When the brake pedal 1 is not operated, if a distance between the engaging step 60a of the interlocking piston 60 and the link plate 97 is represented by $L_1$, a distance between a rear edge of one end of the input port 38 opening to an inner surface of the first cylinder bore 49 and a front edge of the annular groove 53 of the spool valve 50 is represented by $L_2$, a distance between a front edge of the end of the input port 38 opening to the inner surface of the first cylinder bore 49 and the front edge of the annular groove 53 is represented by $L_3$, a distance between both the retainers 78 and 79 engaged with the rod 77 is represented by $L_4$, an amount of movement of the cut-off valve 47 required to reach its closing position, i.e., an amount of advancing movement of the link plate 97 required to close the cut-off valve 47, is represented by $L_5$, and an amount of advancing movement of the auxiliary piston 83 from its retraction limit position to a position placing the second on-off valve 90 in a closed state is represented by $L_6$, the following relationship is set among these values $L_1$ to $L_6$ in order that the engaging step 60a should not abut against the link plate 97 until a fluid pressure of the reaction chamber 51 of the boost control valve means 43 becomes equal to the output pressure of the fluid pressure source 3, i.e., that the link plate 97 should not influence the pressure control operation of the boost control valve means 43:

That is, when the brake pedal 1 is not operated, if $L_4 \geq L_6$ the relationship is set to satisfy $(L_2+L_4-L_6)<L_1<(L_3+L_4-L_6)$, and if $L_4<L_6$, the relationship is set to satisfy $(L_2+L_4)<L_1<(L_3+L_4)$.

Next, the operation of the first embodiment will be described. Supposing the normal braking operation in a state where the fluid pressure source 3 is normally operated, the inlet valves $6_{FL}$, $6_{FR}$ and $6_R$ and the outlet valves $7_{FL}$, $7_{FR}$ and $7_R$ are in their deenergized states (FIG. 1), and the traction-controlling switchover control valve 8 is also in its deenergized state (FIG. 1). Therefore, the first output port $40_1$ of the fluid pressure control unit 2 is in communication with the pilot chambers 34 of the bypass valves $30_{FL}$, $30_{FR}$ and $30_R$ and is also connected with the input fluid pressure chambers 19 of the fluid pressure transmitting means $4_{FL}$, $4_{FR}$. The second output port $40_2$ is in communication with the input fluid pressure chamber 19 of the fluid pressure transmitting means $4_R$.

Figure 4:
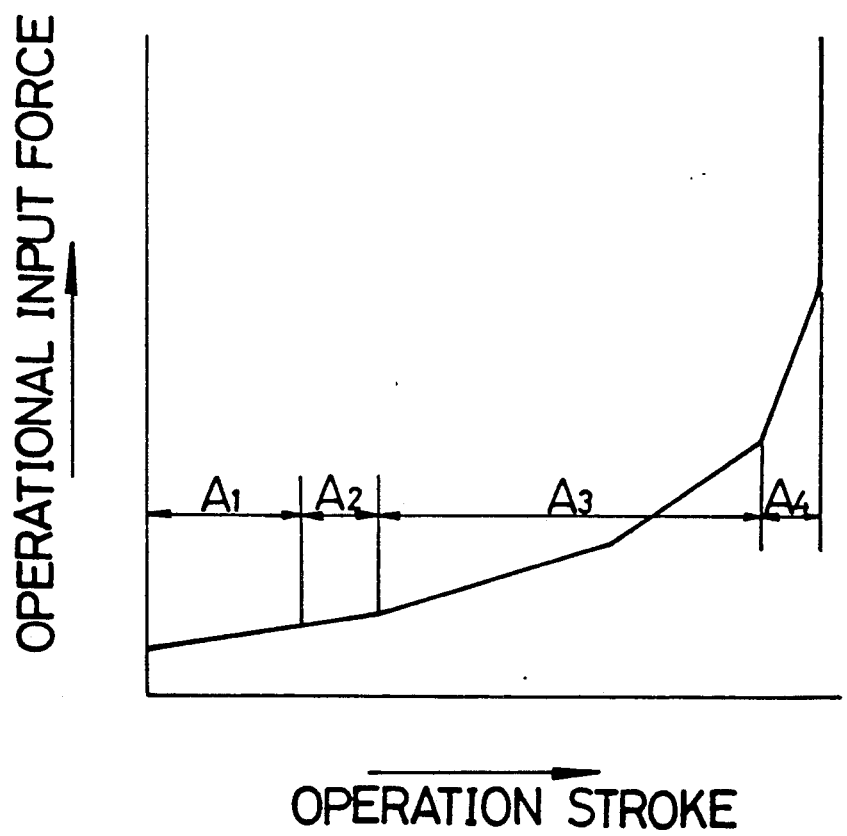
FIG. 4 shows the relationship between the operation stroke and the operating force.

If the brake pedal 1 is depressed in this state, the input piston 61 is advanced, but since the relationship of the set loads $F_1$, $F_2$ and $F_3$ of the return spring 52, the spring 63 and the spring 80 is set as $F_1<F_2<F_3$, the input piston 61, interlocking piston 60, spring 80 and the spool valve 50 are together advanced while keeping their relative positional relationship unchanged but compressing the return spring 52. That is, in a stroke region $A_1$ indicative of the initial braking operation as shown in FIG. 4, the push rod 66 advances while compressing the return spring 52 by gradually increasing the operational input force.

If the spool valve 50 advances to a position to put the input port 38 into communication with the first output port $40_1$ through the annular groove 53, each of the bypass valves $30_{FL}$, $30_{FR}$ and $30_R$ are closed by the output fluid pressure from the first output port $40_1$. Then, the first and second differential pressure valves 54 and 56 are opened, thereby permitting the fluid pressure to be imparted to each of the brake devices $B_{FL}$, $B_{FR}$, $B_{RL}$ and $B_{RR}$ abruptly to eliminate backlash which may exist among components up to the brake devices $B_{FL}$, $B_{FR}$, $B_{RL}$ and $B_{RR}$. Therefore, the initial operation of the brake piston 15 is made smooth.

Since the spring force of the return spring 52 is set equal to or smaller than the set load of the spring 63 when the input port 38 is brought into communication with the first output port $40_1$, the first on-off valve 71 is kept open and no fluid pressure is produced in the pressure chamber 62. Therefore, if a rearwardly acting force, which is a sum of the spring force of the return spring 52 and a force obtained by multiplying the fluid pressure in the reaction chamber 51 by a sectional area of the spool valve 50, becomes larger than the set load $F_2$ of the spring 63, the input piston 61 advances with respect to the interlocking piston 60 while compressing the spring 63 in a stroke region $A_2$ in FIG. 4, and the closing operation of the first on-off valve 71 is started.

When the first on-off valve 71 is closed, fluid pressure is generated in the pressure chamber 62 in response to the advancing movement of the input piston 61, and the fluid pressure in the pressure chamber 62 is applied to the spool valve 50 forwardly. That is, in the initial braking operation, the advancing movement of the input piston 61 is mechanically transmitted to the spool valve 50 through the spring 63, the interlocking piston 60, the spring 80 and the rod 77. During that time, since no fluid pressure is applied to the seal members 67 and 68, it is possible to suppress the friction loss by the seal members 67 and 68 to a relatively small value, and to reduce the initial operational input force to improve the operational feel. Further, despite both the accumulators $45_1$ and $45_2$ being in communication with the pressure chamber 62 for securing the operational stroke, the initial operational stroke is not absorbed by both the stroke accumulators $45_1$ and $45_2$ and thus, no invalid stroke is produced.

In a stroke region $A_3$ after the first on-off valve 71 has been closed, since the bypass valve $30_R$ is also closed, fluid pressure of the pressure chamber 62 is accumulated in the accumulator chambers 101 of both the first and second stroke accumulators $45_1$ and $45_2$, and the input piston 61 is further advanced by the operational force counteracting the spring force of the accumulator spring 104, which makes it possible to secure the operational stroke by both the stroke accumulators $45_1$ and $45_2$. Moreover, since the spring chambers 102 of the stroke accumulators $45_1$ and $45_2$ are in communication with the reservoir 9 through the opened cut-off valve 47, it is possible to operate the accumulator pistons 103 so as to assure a predetermined operational stroke.

In both the stroke accumulators $45_1$ and $45_2$, if the advancing force of the accumulator pistons 103 generated by fluid pressure in the accumulator chamber 101 becomes larger than the spring force of the springs 84 of the first and second auxiliary fluid pressure generating means $44_1$ and $44_2$, both the auxiliary pistons 83 are advanced by the connecting rods 96 to close both the second on-off valves 90. Further, since each of the bypass valves $30_{FL}$ and $30_{FR}$ is also in a closed state, each of the auxiliary fluid pressure generating chambers 82 is brought into a completely closed condition and thus, the advancing movement of the auxiliary piston 83 is prevented and after that, each of the accumulator pistons 103 is advanced while compressing the accumulator spring 104 in response to an increase in the pressure of the accumulator chamber 101.

After fluid pressure has been generated in the pressure chamber 62, the spool valve 50 is moved in front and rear directions so as to balance the force acting in a retracting direction by fluid pressure of the reaction chamber 51 and the force acting in an advancing direction by fluid pressure of the pressure chamber 62, thereby controlling the output pressure fed from the fluid pressure source 3. This enables the amplified fluid pressure corresponding to an amount of operation of the brake pedal 1 to be output from the first and second output ports $40_1$ and $40_2$, and the braking force by the amplified fluid pressure can be obtained in each of the brake devices $B_{FL}$, $B_{FR}$, $B_{RL}$ and $B_{RR}$.

In a stroke region $A_4$ after the operational input force from the brake pedal 1 has become excessively large and a controlled fluid pressure by the boost control valve means 43 has reached the output pressure of the fluid pressure source 3, since the fluid pressure of the reaction chamber 51 is not increased, the input piston 61 and the interlocking piston 60 are advanced while compressing the spring 80. However, after the engaging step portion 60a has engaged with the link plate 97, since the advancing movement of the connecting rod 96 which is in engagement with the link plate 97 is prevented, advancing movement of the input piston 61 and the interlocking piston 60 are also prevented.

In this manner, the fluid pressure from the fluid pressure source 3 can be controlled in accordance with the amount of the braking operation and applied to each of the brake devices $B_{FL}$, $B_{FR}$, $B_{RL}$ and $B_{RR}$. However, in the fluid pressure transmitting means $4_{FL}$, $4_{FR}$ and $4_R$, each of the brake devices $B_{FL}$, $B_{FR}$, $B_{RL}$ and $B_{RR}$ is isolated from the fluid pressure circuit extending from the input fluid pressure chamber 19 to the fluid pressure source 3 by the free piston 21 and hence, any gas which may be mixed into the working fluid in the fluid pressure source 3 can not exert an adverse influence on the brake devices $B_{FL}$, $B_{FR}$, $B_{RL}$ and $B_{RR}$.

If the depression force exerted by the brake pedal 1 becomes excessively large during such braking and a wheel is about to become locked, the inlet valve $6_{FL}$, $6_{FR}$ or $6_R$ corresponding to such wheel is energized to cut off the communication between the first output port $40_1$ and the fluid pressure transmitting means $4_{FL}$, $4_{FR}$ as well as between the second output port $40_2$ and the fluid pressure transmitting means $4_R$. This suppresses an increase in the braking force so as to prevent the wheel from becoming locked. If the wheel still shows a locking tendency through this operation, the tendency can be eliminated by energizing the corresponding one of the outlet valves $7_{FL}$, $7_{FR}$ and $7_R$ to put the input fluid pressure chambers 19 of the fluid pressure transmitting means $4_{FL}$, $4_{FR}$ and $4_R$ into communication with the reservoir 9 and reducing the braking pressure.

Suppose that the output pressure of the fluid pressure source 3 is abnormally reduced by failure in the fluid pressure pump 10 or the like during braking. In such a case, the bypass valves $30_{FL}$, $30_{FR}$ and $30_R$ are opened in accordance with reduction in the output fluid pressure from the first output port $40_1$ of the fluid pressure control unit 2. Therefore, the closing operation of the first on-off valve 71 is started by compression of the spring 63, at an instant when the spring force of the return spring 52 becomes equal to the set load of the spring 63 in accordance with the advancing movement of the input piston 61 by depression of the brake pedal 1, with the result that fluid pressure is generated in the pressure chamber 62 and fed from the fourth output point $40_4$ to the rear wheel brake devices $B_{RL}$ and $B_{RR}$ through the bypass valve $30_R$ and the proportional pressure-reducing valve 5. Further, a force acting in an advancing direction is applied to both the connecting rods 96 in response to generation of fluid pressure in the accumulator chambers 101, and the connecting rods 96 are directly urged by the link plate 97 from an instant when the engaging step portion 61a of the interlocking piston 60 is abutted against the link plate 97. Therefore, in each of the first and second fluid pressure generating means $44_1$ and $44_2$, fluid pressure is generated in the auxiliary fluid pressure generating chamber 82 in response to closing of the second on-off valve 90 caused by advancing movement of the auxiliary piston 83, and such fluid pressure is applied to each of the front wheel brake devices $B_{FL}$ and $B_{FR}$ from the third output port $40_3$ through the bypass valves $30_{FL}$ and $30_{FR}$. Thus, even when the output pressure of the fluid pressure source is abnormally reduced, the fluid pressure which is generated in the operation pressure generating means 42 and the first and second auxiliary fluid pressure generating means $44_1$ and $44_2$ can be applied to each of the brake devices $B_{FL}$, $B_{FR}$, $B_{RL}$ and $B_{RR}$. Moreover, since the auxiliary piston 83 is driven to advance by the advancing operation of the accumulator piston 103 and the link plate 96 of the connecting means 46, a larger advancing force can be applied to the auxiliary piston 83 and thus, it is possible to apply larger fluid pressure to each of the brake devices $B_{FL}$, $B_{FR}$, $B_{RL}$ and $B_{RR}$.

In this case, in order to obtain braking pressure even when output pressure of the fluid pressure source 3 is abnormally reduced, the two auxiliary fluid pressure generating means $44_1$ and $44_2$ are disposed in the housing 41 in such a manner that the distances from the means $44_1$ and $44_2$ to the axis of the boost control valve means 43 are set equal while leaving circumferentially equal distances between the means $44_1$ and $44_2$. Therefore, a driving force transmitted from the link plate 97 of the connection means 46 is distributed uniformly to both the two auxiliary fluid pressure generating means $44_1$ and $44_2$ to prevent a torsion or moment from being generated and thus, the operation of the auxiliary fluid pressure generating means $44_1$ and $44_2$ can be made smooth to reliably ensure generation of the auxiliary fluid pressure.

Further, if the engaging step portion 60a is abutted against the link plate 97 to move it away form the rear housing part 41b, the cutoff valve 47 is closed to bring the spring chambers 102 into a completely closed state. Therefore, in each of the stroke accumulators $45_1$ and $45_2$, the accumulator piston 10 is prevented from being moved in a direction to increase the volume of the accumulator chamber 101 more than necessary, thereby reducing any possible invalid strokes of the input piston 61 and thus, a fluid pressure can effectively be generated in the pressure chamber 62. Accordingly, even if the diameters of each of the second and third cylinder bores 64 and 85 are made relatively small, a fluid pressure of sufficient level can be supplied to each of the brake devices $B_{FL}$, $B_{FR}$, $B_{RL}$ and $B_{RR}$, contributing to reduction in sizes of the operational pressure generating means 43 and both the auxiliary fluid pressure generating means $44_1$ and $44_2$.

Further, a rear portion of the connecting rod 96 is relatively movably fitted in the retainer 108, and the connecting rod 96 is capable of advancing by a further distance while being pushed by the link plate 97 even after the retainer 108 comes into abutment against the front end wall of the fourth cylinder bore 105. With this arrangement, the axial length of the fourth cylinder bore 105 can be made shorter as compared with an arrangement wherein the accumulator spring 104 is interposed between the rear end of the connecting rod 96 and the accumulator piston 103 without using the retainer 108, which contributes to making the first and second stroke accumulators $45_1$ and $45_2$ compact.

Suppose that a fall in fluid pressure is generated in the circuit between the third output port $40_3$ and both the bypass valves $30_{FL}$ and $30_{FR}$ in a state where the output pressure of the fluid pressure source 3 is normal. In such a case, fluid pressure which is generated in the pressure chamber 62 by depression of the brake pedal 1 is applied to the accumulator chambers 101 of both the stroke accumulators $45_1$ and $45_2$, the accumulator pistons 103 advance with such fluid pressure, thereby causing the auxiliary pistons 83 of the first and second auxiliary fluid pressure generating means $44_1$ and $44_2$ to advance through the accumulator springs 104 and the connecting rods 96. Since at this moment, the pressure in the auxiliary fluid pressure generating chambers 82 has been reduced, the amount of advancing movement of each accumulator piston 103 becomes larger than that of a predetermined stroke, and the extent of depression of the brake pedal 1 becomes large against a driver's will. This enables the driver to easily become aware that a fall in fluid pressure has been produced and thus makes it unnecessary to provide a special arrangement for detecting such fall in fluid pressure. Further, if a fall in fluid pressure is produced in a circuit between the fourth output port $40_4$ and the bypass valve $30_R$, the extend of depression of the brake pedal 1 becomes large against the driver's will following reduction of fluid pressure in the pressure chamber 62, so that the driver can easily become aware of the fall in fluid pressure which also renders unnecessary a special arrangement for detecting the pressure fall.

Moreover, during non-braking, when a driving force of the engine becomes excessively large and a driving wheel is about to slip excessively, the traction-controlling switchover control valve 8 is energized. Thereby, an output fluid pressure of the fluid pressure source 3 is applied to the input fluid pressure chambers 19 of the fluid pressure transmitting means $4_{FL}$ and $4_{FR}$, and the braking force is generated in the left and right front wheel brake devices $B_{FL}$ and $B_{FR}$ which are driving wheels in this embodiment, thereby avoiding generation of an excessive slip. Thereafter, the braking force can be controlled by energizing or deenergizing the inlet valves $6_{FL}$ and $6_{FR}$ and outlet valves $7_{FL}$ and $7_{FR}$ in the same manner as the above described anti-lock control.

Figure 5:
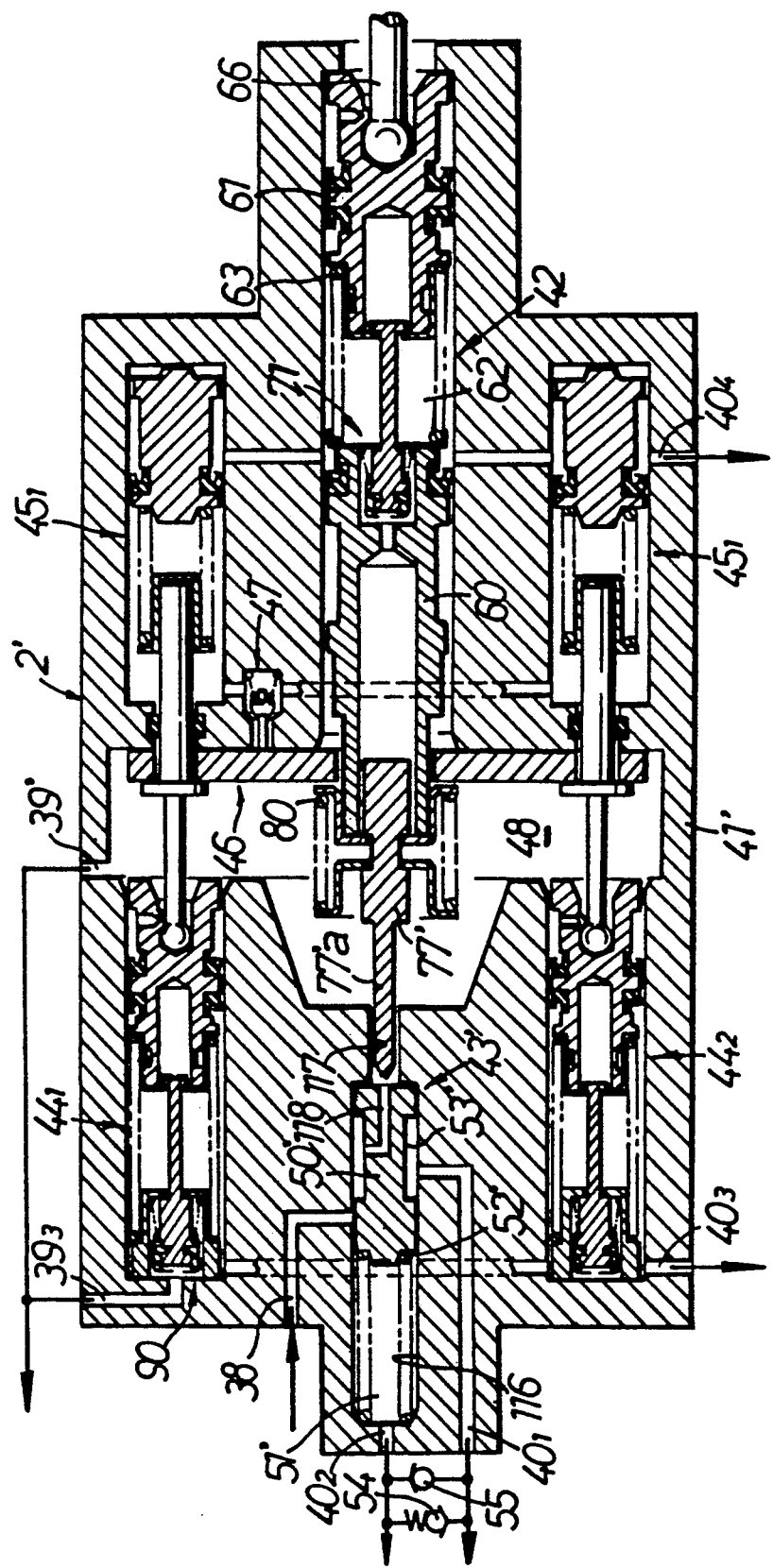
FIG. 5 is a longitudinal sectional view corresponding to FIG. 2, but illustrates a second embodiment.

FIG. 5 illustrates a second embodiment and parts corresponding to those in the previous first embodiment are designated by similar reference numerals.

Disposed in a housing 41' of a fluid pressure control unit 2' are an operational pressure generating means 42 capable of generating nonamplified fluid pressure corresponding to an operational force, a boost control valve means 43' capable of controlling an output pressure of a fluid pressure source 3 (see FIG. 1) in accordance with an amount of operation and outputting amplified fluid pressure, first and second auxiliary fluid pressure generating means $44_1$ and $44_2$ for outputting auxiliary fluid pressure in place of the output pressure of the boost control valve means 43' when the output pressure of the fluid pressure source 3 is abnormally reduced, first and second stroke accumulators $45_1$ and $45_2$ for accumulating pressure generated by the operational pressure generating means 42 to secure an operation stroke, a connecting means 46 for transmitting the inputted operational force to the first and second auxiliary fluid pressure generating means $44_1$ and $44_2$ only when the output pressure of the fluid pressure source 3 is abnormally reduced, and a cut-off valve 47 for locking the accumulating operation of the first and second stroke accumulators $45_1$ and $45_2$ when the output pressure of the fluid pressure source 3 is abnormally reduced.

The boost control valve means 43' is comprised of a slide member 50' slidably fitted in the housing 41', and a valve stem 77'a integrally formed with a rod 77' which is disposed between the slide member 50' and an interlocking piston 60. The housing 41' is coaxially provided in a front portion thereof with a cylinder bore 116 having at a front end wall thereof a second output port $40_2$, and an insert hole 117 having a smaller diameter than that of the cylinder bore 116. An input port 38 is opened into an inner surface of the cylinder bore 116, and the first output port $40_1$ is opened into the inner surface of the cylinder bore 116 at a rear position rearwardly of the input port 38. The insert hole 117 is opened into the release chamber 48 leading to a release port 39'. The slide member 50' is formed cylindrically and is provided around an outer surface thereof with an annular groove 53'. The slide member 50' is slidably fitted in the cylinder bore 116 such that a front surface of the member 50' faces a reaction chamber 51', and a return spring 52' is contained in the reaction chamber 51'. Further, the slide member 50' is provided therein with a valve bore 118 having one end opened into the annular groove 53' and the other end opened into a rear end surface of the slide member 50'.

The valve stem 77'a is inserted in the insert hole 117 such that the stem 77'a closes the other end of the valve bore 118 and abuts against a rear end of the slide member 50'. A space is provided between a tip end of the valve stem 77'a and the rear end surface of the slide member 50' in a state where the input piston 61 is in its retraction limit position during non-braking.

In the boost control valve means 43', if the input piston 61 advances in accordance with braking operation, the rod 77' is advanced through the interlocking piston 60 and the spring 80, thereby causing the slide member 50' to start advancing from an instant when the valve stem 77'a closes the valve bore 118 and abuts against the rear end surface of the slide member 50'. When the slide member 50' is advanced to a position where the input port 38 is put into communication with the first output port $40_1$ through the annular groove 53', the slide member 50' is moved reciprocally in front and rear directions so as to balance the reaction force by fluid pressure generated in the reaction chamber 51' and the advancing force by fluid pressure generated in the pressure chamber 62 of the operational pressure generating means 42, thus causing the pressure control operation to be started by the boost control valve means 43'.

By this second embodiment, the same effects as those of the previous first embodiment can be achieved.

Figure 6:
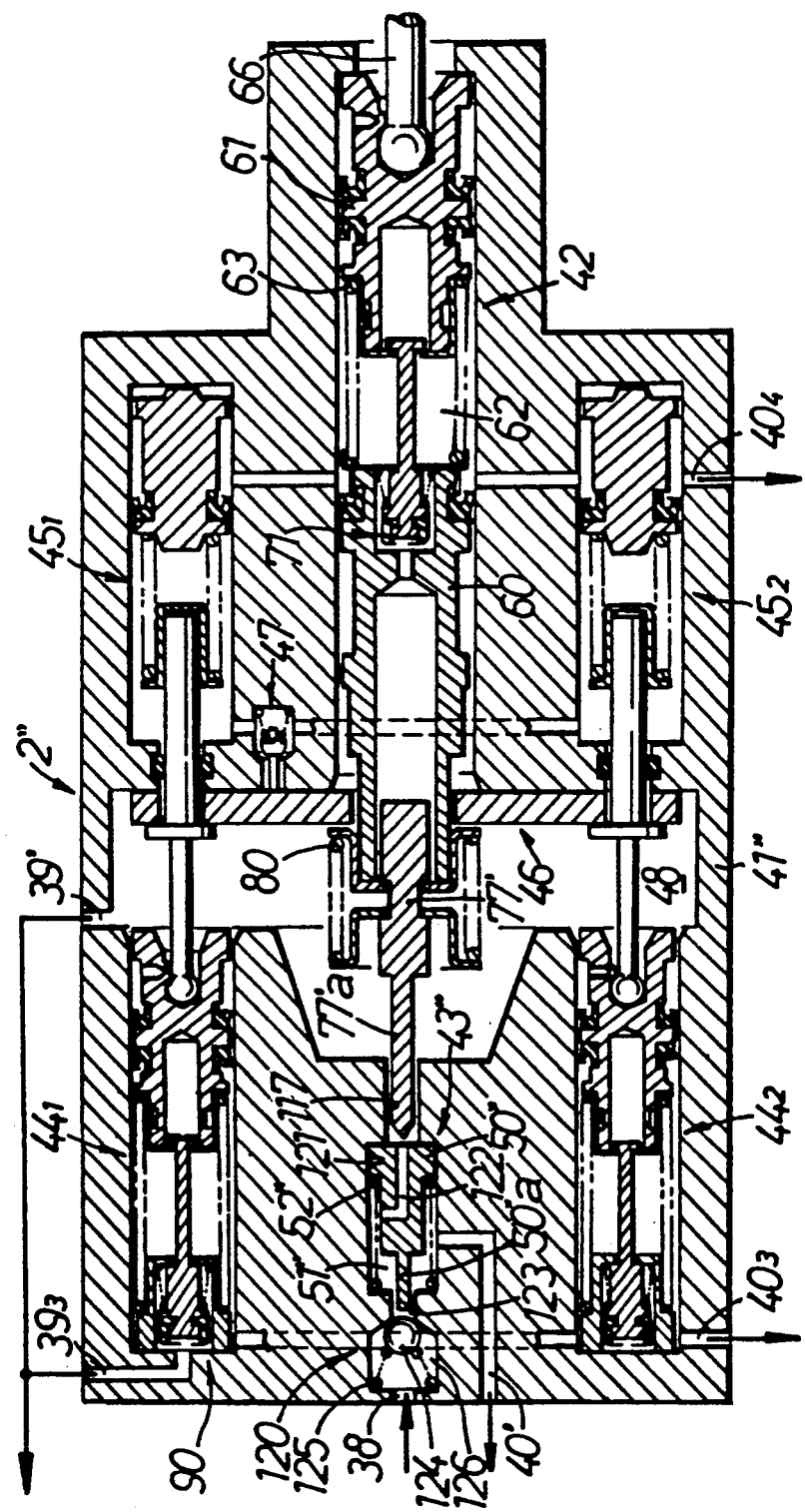
FIG. 6 is a longitudinal sectional view corresponding to FIG. 2, but illustrates a third embodiment.

Further, a boost control valve means 43" according to a third embodiment as shown in FIG. 6 can be mounted in a housing 41" of a fluid pressure control unit 2" in place of the boost control valve means 43 and 43' of the previous embodiments.

The housing 41" is provided therein with an output port 40' which is in communication with an input fluid pressure chamber 19 of each of fluid pressure transmitting means $4_{FL}$, $4_{FR}$ and $4_R$ as well as with a pilot chamber 34 of each of bypass valves $30_{FL}$, $30_{FR}$ and $30_R$ as shown in FIG. 1.

The boost control valve means 43" are comprised of a slide member 50" slidably fitted in the housing 41", a valve stem 77'a integrally formed with the rod 77' which is disposed between the slide member 50" and an interlocking piston 60, and an on-off valve 120 interposed between an input port 38 and a reaction chamber 51".

The housing 41" is provided at its front portion with a cylinder bore 121 having a large diameter which is continuously and coaxially formed with the insert hole 117, and the slide member 50" is slidably fitted in the cylinder bore 121 such that a front surface of the member 50" faces the reaction chamber 51'. The slide member 50" is provided with a valve bore 122 having one end thereof in communication with the reaction chamber 51" and the other end opening into a rear end surface of the slide member 50". A return spring 52" interposed between the housing 41" and the slide member 50" is contained in the reaction chamber 51". The output port 40' is always in communication with the reaction chamber 51".

The on-off valve 120 is comprised of a valve bore 123 coaxially formed in a front end wall of the cylinder bore 121, a valve body 124 capable of opening and closing the valve bore 123, a valve spring 125 for biasing the valve body 124 in its closing direction, and a driving stem 50'a which is coaxially formed at a front end surface of the slide member 50" and is loosely inserted in the valve bore 123 for biasing the valve body 124 in its opening direction. The housing 41" is provided therein with a valve chamber 126 which is in communication with the input port 38 and is coaxially formed with the valve bore 123. The valve body 124 and the valve spring 125 are contained in the valve chamber 126.

By the boost control valve means 43", if the input piston 61 is advanced in accordance with the braking operation, the rod 77' is advanced through the spring 63, the interlocking piston 60 and the spring 80, and from an instant when the valve stem 77'a closes the valve bore 122 and abuts against the rear end surface of the slide member 50", the advancing operation of the slide member 50" is started thereby causing the on-off valve 120 to open by the movement of the slide member 50" to put the input port 38 into communication with the output port 40'. The slide member 50" is moved in front and rear directions so as to balance the reaction force by fluid pressure generated in the reaction chamber 51 and the advancing force by fluid pressure generated in the pressure chamber 62 of the operational pressure generating means 42, causing output port 40' to be changed, to control the output pressure from the output port 40'.

By this third embodiment, the same effect as those of the first and second embodiments can also be achieved.

Although in each of the above embodiments the interlocking piston 60 which is operatively connected to the spool valve 50 or the slide member 50' or 50" is arranged to face at its back surface the pressure chamber 62, the reaction chamber 62 may be arranged to directly face the back surface of the spool valve 50 or of the slide members 50' or 50".

While preferred embodiments have been shown and described, it will be understood that the above description of the present invention is susceptible to various modifications, changes and adaptations, and the same are intended to be comprehended within the meaning and range of equivalents of the appended claims.

What is claimed is:

1. A fluid pressure type booster device, comprising:
   a housing including an input port connected to a fluid pressure source, a release port connected to a fluid tank, and an output port connected to a fluid pressure operated apparatus;
   a slide member having a front surface facing a reaction chamber leading to the output port and slidably fitted in the housing for movement between an advancing position to put the input port into communication with the output port, and a retracting position to put the release port into communication with the output port;
   a pressure chamber which is capable of generating a fluid pressure in response to operation of an operating member which faces a back surface of the slide member or an interlocking member operatively connected to the slide member;
   an input piston operatively connected to the operating member and slidably fitted in the housing to define the pressure chamber between the input piston and the slide member or the interlocking member;
   a spring mounted in a compressed manner between the input piston and the slide member or the interlocking member; and
   an on-off valve interposed between the pressure chamber and the fluid tank and arranged to be closed due to an advancing movement of the input piston with respect to the slide member or the interlocking member by an amount not less than a predetermined value, said spring being arranged to start contracting for closing the on-off valve in accordance with the advancing movement of the input piston from a state in which the slide member has been so advanced as to place the input port in communication with the output port.

2. A fluid pressure type booster device according to claim 1, wherein said pressure chamber is connected to an accumulator chamber of a stroke accumulator.

3. A fluid pressure type booster device according to claim 1, wherein said pressure operated chamber is connected to the fluid pressure apparatus.

4. A fluid pressure type booster device according to claim 1, wherein a further output port is provided in said housing in communication with said pressure chamber, said further output port leading to said fluid pressure operated apparatus via a valve means which is opened in response to a reduction in fluid pressure output from the first-mentioned output port.

5. A fluid pressure type booster device according to claim 1, further comprising auxiliary pressure generating means disposed in said housing, said auxiliary pressure generating means being capable of generating a fluid pressure in response to an advancing movement of said input piston more than a given value.

6. A fluid pressure type booster device according to claim 5, wherein said fluid pressure of the auxiliary pressure generating means is output from a further output port provided in said housing and is fed to said fluid pressure operated apparatus via a valve means which is opened in response to a reduction in fluid pressure output from the first-mentioned output port.

7. A fluid pressure type booster device according to claim 5, wherein a pair of said auxiliary pressure generating means are provided in said housing on diametrical opposite sides of said slide member.

8. A brake control system for a vehicle, comprising:
   wheel brake means for braking a wheel of a vehicle;
   fluid pressure transmitting means for transmitting fluid pressure to said wheel brake means;
   a fluid pressure source;
   an operating member for producing fluid pressure;
   fluid pressure control means for selectively controlling supply of fluid pressure to said fluid pressure transmitting means from one of said fluid pressure source and said operating member;
wherein said fluid pressure control means comprises:
   a housing including an input port connected to said fluid pressure source, a release port, and an output port connected to said fluid pressure transmitting means;
   a slide member movable between an advancing position to place said input port in communication with said output port, and a retracting position to place said release port in communication with said output port;
   a pressure chamber which generates fluid pressure in response to operation of said operating member;
   on-off valve means interposed between said pressure chamber and a fluid tank, said on-off valve means being closed when said slide member moves to said advancing position; and
   spring means mounted in said pressure chamber, said spring ;means being formed to start contracting when said slide member moves to said advancing position.

9. A brake control system as claimed in claim 8, further comprising a reaction chamber in said fluid pressure control means.

10. A brake control system as claimed in claim 9, wherein said slide member is slidable in said housing for movement between said advancing position and said retracting position, and has a front surface which faces said reaction chamber.

11. A brake control system as claimed in claim 10, wherein said reaction chamber is disposed between said slide member and said output port.

12. A brake control system as claimed in claim 10, further comprising resilient means disposed inside said reaction chamber for biasing said sliding member, said resilient means having a set load smaller than that of said spring means.

13. A brake control system as claimed in claim 12, wherein said resilient means biases said slide member in a direction away from said output port.

14. A brake control system as claimed in claim 12, wherein said output port is a first output port, and further comprising a second output port.

15. A brake control system as claimed in claim 14, wherein the position of said slide member controls pressure supplied to said second output port.

16. A brake control system as claimed in claim 15, further comprising differential pressure valve means connecting said first and second output ports which is opened when the fluid pressure of said first output port becomes greater than that of the second output port by a predetermined value, so as to permit only a flow of fluid from said first output toward said second output port.

17. A brake control system as claimed in claim 8, wherein said slide member includes a piston portion and a spool valve portion, said spool valve portion in said advancing position placing said input port in communication with said output port, and in said retracting position placing said release port in communication with said output port.

18. A brake control system as claimed in claim 8, further comprising at least one stroke accumulator means in said housing.

19. A brake control system as claimed in claim 8, wherein a further output port is provided in said housing in communication with said pressure chamber, said further output port leading to said wheel brake means via a valve means which is opened in response to a reduction in fluid pressure output from the first-mentioned output port.

20. A brake control system as claimed in claim 8, wherein said fluid pressure control means further comprises auxiliary pressure generating means disposed in said housing, said auxiliary pressure generating means being capable of generating a fluid pressure in response to an advancing movement of said input piston more than a given value.

21. A brake control system as claimed in claim 20, wherein said fluid pressure of the auxiliary pressure generating means is output from a further output port provided in said housing and is fed to said wheel brake means via a valve means which is opened in response to a reduction in fluid pressure output from the first-mentioned output port.

22. A brake control system as claimed in claim 20, wherein a pair of said auxiliary pressure generating means are provided in said housing on diametrical opposite sides of said slide chamber.

23. A fluid pressure booster apparatus, comprising:
fluid pressure transmitting means for transmitting fluid pressure to a fluid pressure driven device;
a fluid pressure source;
an operating member for producing fluid pressure;
fluid pressure control means for selectively controlling supply of fluid pressure to said fluid pressure transmitting means from one of said fluid pressure source and said operating member;
said fluid pressure control means comprising:
a housing including an input port connected to said fluid pressure source, a release port, and an output port connected to said fluid pressure transmitting means;
a slide member movable between an advancing position to place said input port in communication with said output port, and a retracting position to place said release port in communication with said output port;
a pressure chamber which generates fluid pressure in response to operation of said operating member;
on-off valve means interposed between said pressure chamber and a fluid tank, said on-off valve means being closed when said slide member moves to said advancing position; and
spring means mounted in said pressure chamber, said spring means being formed to start contracting when said slide member moves to said advancing position.

24. A fluid pressure booster apparatus as claimed in claim 23, further comprising a reaction chamber in said fluid pressure control means.

25. A fluid pressure booster apparatus as claimed in claim 23, wherein said output port is a first output port, and further comprising a second output port.

26. A fluid pressure booster apparatus as claimed in claim 25, wherein the position of said slide member controls pressure supplied to said second output port.

27. A fluid pressure booster apparatus as claimed in claim 25, further comprising differential pressure valve means connecting said first and second output ports which is opened when the fluid pressure of said first output port becomes greater than that of the second output port by a predetermined value, so as to permit only a flow of fluid from said first output port toward said second output port.

28. A fluid pressure booster apparatus as claimed in claim 23, wherein said slide member includes a piston portion and a spool valve portion, said spool valve portion in said advancing position placing said input port in communication wit said output port, and in said retracting position placing said release port in communication with said output port.

29. A fluid pressure booster apparatus as claimed in claim 23, wherein a further output port is provided in said housing in communication with said pressure chamber, said further output port leading to said fluid pressure driven device via a valve means which is opened in response to a reduction in fluid pressure output from the first-mentioned output port.

30. A fluid pressure booster apparatus as claimed in claim 23, wherein said fluid pressure control means further comprises auxiliary pressure generating means disposed in said housing, said auxiliary pressure generating means being capable of generating a fluid pressure in response to an advancing movement of said input piston more than a given value.

31. A fluid pressure booster apparatus as claimed in claim 30, wherein said fluid pressure of the auxiliary pressure generating means is output from a further output port provided in said housing and is fed to said fluid pressure driven device via a valve means which is opened in response to a reduction in fluid pressure output from the first-mentioned output port.

32. A fluid pressure booster apparatus as claimed in claim 30, wherein a pair of said auxiliary pressure generating means are provided in said housing on diametrical opposite sides of said slide member.

* * * * *